United States Patent [19]

Bennato

[11] Patent Number: 5,059,017
[45] Date of Patent: Oct. 22, 1991

[54] HINGE STRUCTURE, PARTICULARLY FOR SPECTACLE FRAMES

[75] Inventor: Antonio Bennato, Feltre Di Alano Di Piave, Italy

[73] Assignee: Moda Solaris S.p.A., Pederobba, Italy

[21] Appl. No.: 531,271

[22] Filed: May 31, 1990

[30] Foreign Application Priority Data

Dec. 21, 1989 [IT] Italy .............. 82628 A/89

[51] Int. Cl.⁵ .............................. G02C 5/22
[52] U.S. Cl. ................... 351/121; 351/153; 16/228
[58] Field of Search ............. 351/119, 121, 154, 153; 16/228

[56] References Cited

U.S. PATENT DOCUMENTS 3,582,194  6/1971  Liataud ................. 351/121
4,354,744 10/1982  Bononi ................. 351/121

Primary Examiner—Rodney B. Bovernick
Assistant Examiner—J. Ryan
Attorney, Agent, or Firm—Guido Modiano; Albert Josif

[57] ABSTRACT

The hinge structure has the peculiarity of being constituted by an elastically compressible bellows-like element which comprises lugs for temporary coupling to the frame and to a rod. The rods are biased to a position adjacent to the lens of the frame in case of non-use.

8 Claims, 1 Drawing Sheet

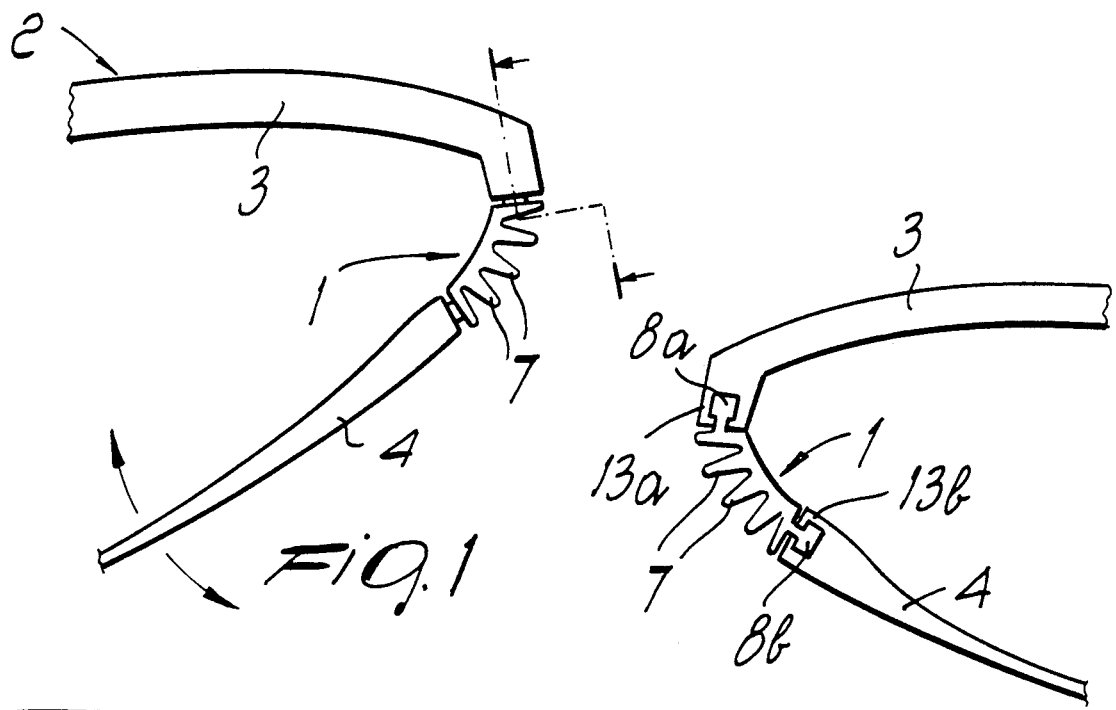
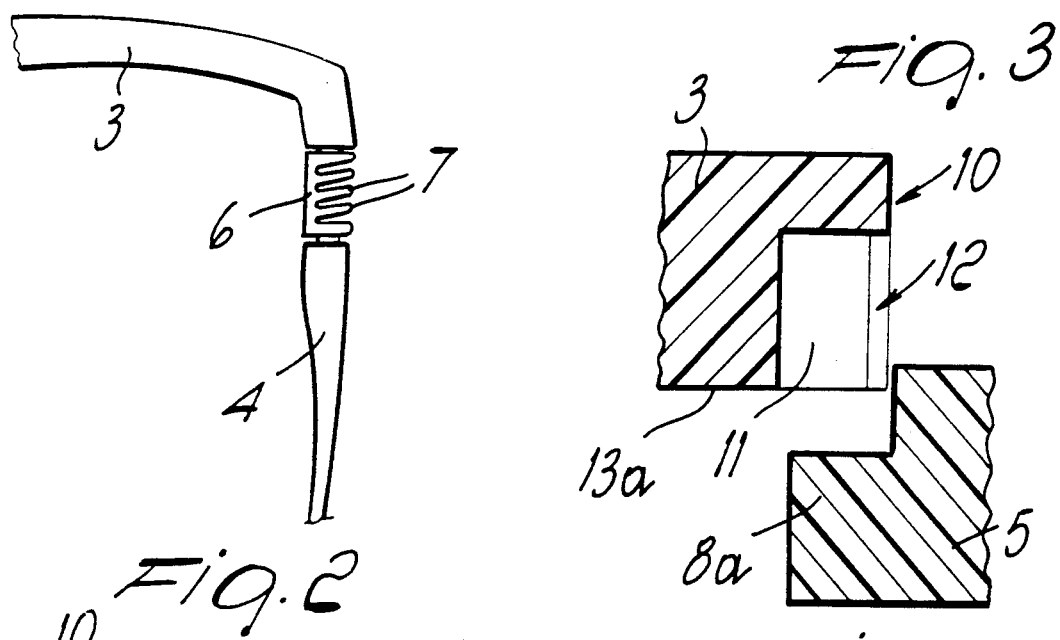
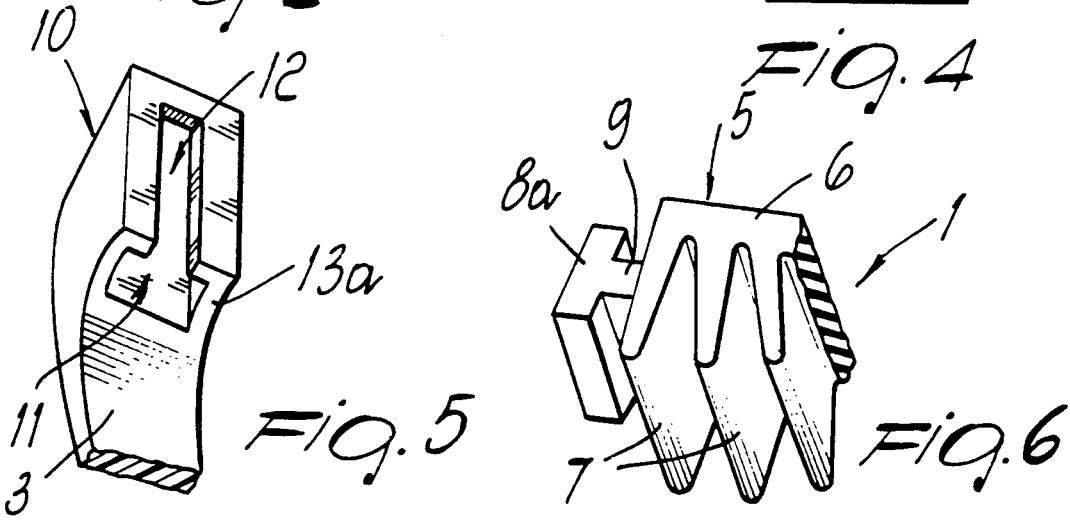

HINGE STRUCTURE, PARTICULARLY FOR SPECTACLE FRAMES

BACKGROUND OF THE INVENTION

The present application relates to a hinge structure particularly usable for spectacle frames.

Numerous kinds of hinges are currently known; the simplest are constituted by cams which protrude at the end of a rod and are associated at tabs which protrude at the end of the frame by means of a locking screw.

Said known hinges, however, require the user to fold them approximately parallel to the lens in the frame in case of non-use for storage, and furthermore do not ensure a good grip of the rod at the temples.

The repositioning of the frame is thus inconvenient, and said frame can slip off due to a sudden movement.

As a partial solution to these disadvantages, hinges are known which comprise rods which have, at one end, an axial cavity which acts as seat for a spring and a ball which interacts with a cam defined at the end of the front portion of the frame.

Such known hinge types therefore allow an extra opening beyond the condition of approximately ninety degrees with respect to the plane of arrangement of the front portion, so as to allow them to adhere optimally at the temples of the users in order to prevent the spectacles from slipping off.

Other known hinges furthermore provide the automatic repositioning of the rod proximate to the front portion once a small rotation toward said front portion has been imparted thereto starting from the condition of normal use.

All these known types of hinge, however, essentially have the disadvantage of being expensive, both because they are constituted by a large number of components which require special and accurate assembly and because it is necessary to use materials which are not subjected to considerable wear due to the extremely large number of operations for opening and closing the rods with respect to the front portion performed every day by the user.

Another disadvantage resides in that said known types of hinge also have not optimum dimensions and consequent aesthetic solutions, due to the need to accommodate all the components in order to achieve the extra opening or the automatic closure of the rod.

SUMMARY OF THE INVENTION

The aim of the present invention is therefore to eliminate the disadvantages described above in known types by providing a hinge which is structurally very simple and is also easy to manufacture.

Within the scope of the above described aim, another important object is to obtain a hinge which is associable with the frame in a rapid and simple manner.

Another important object is to provide a hinge which has a small number of components.

Still another important object is to provide a hinge which allows the rod to adhere satisfactorily to the temples as well as the automatic closure of said rod o the front portion.

Still another object is to provide a hinge which allows progressive adjustment of the fit.

Not least object is to provide a hinge which associates with the preceding characteristics that of having very low production and assembly costs.

The above described aim and objects and others which will become apparent hereinafter are achieved by a hinge structure, particularly for spectacle frames, which is characterized in that it is constituted by an elastically compressible bellows-like element, said bellows-like element comprising means for temporary coupling to complimentarily shaped grip means provided on said frame and on a rod.

BRIEF DESCRIPTION OF THE DRAWINGS

Further characteristics and advantages of the invention will become apparent from the detailed description of a particular but not exclusive embodiment, illustrated only by way of non-limitative example in the accompanying drawings, wherein:

FIG. 1 is a top view of the hinge structure associated with the frame and with a rod in a condition of partial opening which can be obtained by the user by gripping said rod and imparting thereto an angular movement with respect to the front portion;

FIG. 2 is a view, similar to the preceding one, of the compression undergone by the bellows-like element in the condition of use of the frame;

FIG. 3 is a bottom view, similar to that of FIG. 1;

FIG. 4 is a view taken along the sectional plane IV—IV of FIG. 1;

FIG. 5 is a perspective view from below of the end of the frame which has the grip means provided thereon;

FIG. 6 is a partially sectional perspective view of the bellows-like element.

DESCRIPTION OF THE PREFERRED EMBODIMENTS

With reference to the above figures, the hinge structure, generally indicated by the reference numeral 1, is particularly suitable for frames 2 of spectacles which comprise a lens holding front portion and a rod or temple 4.

The hinge structure 1 is constituted by at least one spring-loadable bellows-like element 5 which has a ribbing 6 from which a plurality of substantially perpendicular wings 7 extends; said wings have such dimensions as to give the bellows-like element 5 a curved configuration when at rest.

Temporary coupling means are provided at the wings 7 located at the ends of the ribbing 6 and are constituted by lugs 8a and 8b which protrude longitudinally to each of said wings and have a slightly smaller extension than said wings.

Said lugs 8a and 8b have, in a transverse cross section, a T-shaped configuration and are connected to the wings 7 at the stem 9.

Each of the lugs 8a and 8b is temporarily associable at complementarily shaped grip means defined on the end 10 of the front portion 3 of the frame 2 and at the end of the rod.

Said grip means are constituted by a seat 11 provided both at said ends 10 of the front portion 3 and at the end of the rod 4. The seats 11 are shaped complementarily to the lugs 8a,8b and have a longitudinal opening 12 for accommodating the stem 9.

The seats 11 and the longitudinal opening 12 extend from the lower surfaces 13a, 13b of the end 10 of the front portion 3 and from the corresponding end of the rod 4.

The use of the hinge structure is therefore as follows: the bellows-like elements 5 can be produced beforehand by molding plastic material and be subsequently coupled at the seats defined at the ends of the front portion of the rods.

By associating said lugs 8a and 8b at the lower surfaces 13a and 13b of said ends, a frame is obtained which has no upward indication of the coupling between the bellows-like element and the other components of the spectacles, thus achieving an optimum aesthetic configuration.

Once the bellows-like element has been associated with the frame, said element will naturally have a width and thickness approximately equal to those of the end of the components with which it is associated.

It has thus been observed that the invention has achieved the above mentioned aim and objects, a hinge structure having been obtained which is composed in practice of a single element which has extremely small production costs, since it is devoid of any step intermediate to the assembly of the components.

The bellows-like element is therefore associable, in a rapid and extremely simple manner, with the front portion and with the rod, immediately giving the latter the arrangement adjacent to the front portion by virtue of the curved configuration imparted to said bellows-like element.

In order to wear the frame, the user must merely slightly divaricate the rods, which by virtue of the elastic compression of the bellows-like element adhere perfectly at the temples of the user.

The interchangeability of the bellows-like elements 5 and/or of the rod and/or of the front portion furthermore allows the aesthetic customization of the spectacles on the part of the user, all at very low costs and by means of extremely easy operations.

The invention is naturally susceptible to numerous modifications and variations, all of which are within the scope of the same inventive concept.

The materials, as well as the dimensions, which constitute the individual components of the device may also be the most pertinent according to the specific requirements.

I claim:

1. Hinge structure, particularly for spectacle frames, comprising an elastically compressible bellows-like element, said bellows-like element comprising means for temporary coupling to complimentarily shaped grip means defined on a frame and on a rod, said bellows-like element having a ribbing from which a plurality of wings extends approximately perpendicular and in the same direction, said structure comprising longitudinal ends at which lugs are provided at said wings, said lugs constituting said means for temporarily coupling.

2. Hinge structure according to claim 1, wherein said wings have dimensions so as to give said bellows-like element a curved configuration when at rest.

3. Hinge structure according to claim 1, wherein said lugs protrude longitudinally to each of said wings and have a slightly smaller extension that said wings.

4. Hinge structure according to claim 1, wherein said lugs have, in a transverse cross section, a T-shaped configuration defining a stem, said lugs being connected to said wings at said stem.

5. Hinge structure according to claim 1, wherein each of said lugs is temporarily associable at the complimentarily shaped grip means defined on ends of a front portion of said frame and of said rod, said grip means being constituted by a longitudinal seat connected to an opening for accommodating said lugs.

6. Hinge structure according to claim 5, wherein said seats and said openings extend from lower surfaces of said ends of said front portion and of said rod.

7. Hinge for spectacle frames which comprises a lens holding front frame portion (2) and a temple (4) and which define an outwardly facing surface and an inwardly facing surface, said hinge being constituted by at least one spring-loadable elastically compressible bellows-like element (1), said bellows-like element having a first end and a second end, said first end being at least temporarily connectable to said front frame portion and said second end being at least temporarily connectable to said temple, said bellows-like element defining a ribbing (6) from which a plurality of wings (7) extend substantially perpendicular thereto, said ribbing being arrangeable at the inwardly facing surface of said spectacle frames and thereby said wings extend to the outwardly facing surface thereof, and in an uncompressed condition of said elastically compressible bellows-like element, said ribbing having a substantially curved configuration.

8. Hinge for spectacle frames which comprise a lens holding front frame portion (2) and a temple (4) and which define an outwardly facing surface and an inwardly facing surface, said hinge being constituted by at least one spring-loadable elastically compressible bellows-like element (1), said bellows-like element having a first end and a second end, said first end being at least temporarily connectable to said front frame portion and said second end being at least temporarily connectable to said temple, said bellows-like element defining a ribbing (6) from which a plurality of wings (7) extend substantially perpendicular thereto, said ribbing being arrangeable at the inwardly facing surface of said spectacle frames and thereby said wings extend to the outwardly facing surface thereof, and in an uncompressed condition of said elastically compressible bellows-like element, said ribbing having a substantially curved configuration, said ends of said bellows-like element being provided with substantially T-shaped lugs (8a,8b) for slide-fitting into correspondingly shaped longitudinal seats (11,12) provided at respective ends of said front frame portion and said temple.

* * * * *